May 12, 1925.

J. S. HERZOG

APRON CONVEYER

Filed Feb. 2, 1923

INVENTOR
John S. Herzog
BY
Jueers Lieberman
ATTORNEYS

May 12, 1925.

J. S. HERZOG

APRON CONVEYER

Filed Feb. 2, 1923

INVENTOR
John S. Herzog
BY
ATTORNEYS

Patented May 12, 1925.

1,537,444

UNITED STATES PATENT OFFICE.

JOHN S. HERZOG, OF NEWARK, OHIO.

APRON CONVEYER.

Application filed February 2, 1923. Serial No. 616,462.

*To all whom it may concern:*

Be it known that I, JOHN S. HERZOG, a citizen of the United States, and a resident of Newark, in the county of Licking and State of Ohio, have invented certain new and useful Improvements in Apron Conveyers, of which the following is a specification.

The apron conveyer of this invention, although adapted to carry all kinds of articles other than very fine material is especially designed for use in places or chambers of variable temperatures. It comprises continuous chain carriers controlled by sprocket wheels on drive shafts and slats, bars or pans laterally arranged and of a width substantially equal to the length of the links of the chain. The chain links are constructed and connected together so as to provide great strength and eliminate all traction or draft strains from the bolts or rods used to hold the links together, and the slats, bars or pans are, without detached parts or devices, so attached to the chains as to maintain proper relations therewith and be free to expand and contract without submitting any part of the conveyer to deleterious strain.

In the accompanying drawings forming part of this specification

Figure 1:
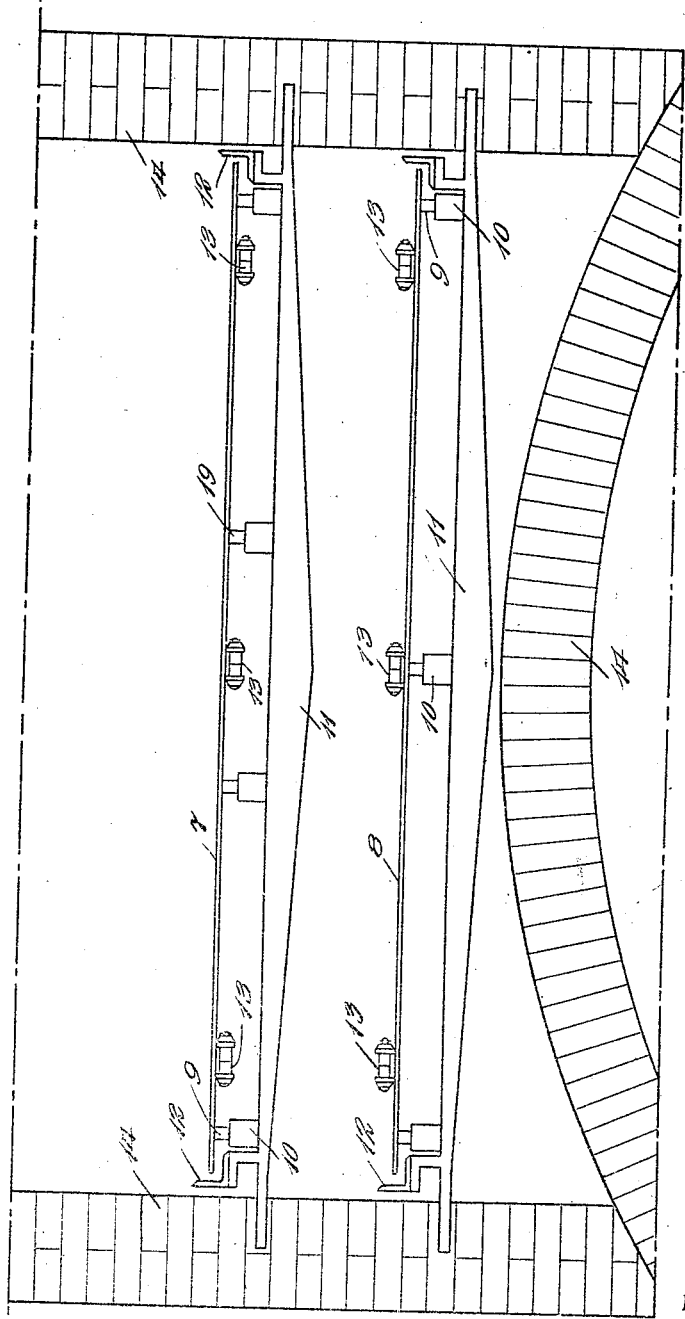
Fig. 1 is a transverse section of an apron conveyer, conventionally shown, embodying the novel features of this invention.

Referring to Fig. 1, 7 designates the active or go portion of the conveyer, 8 the return portion, 9 supporting rollers, the number and spacing apart of which is such as to adequately support the load carried by the conveyer, 10 longitudinal bars or stringer pieces to which the rollers 9 are secured, 11 transverse girders to which the stringers 10 are attached, 12 side guide rails, 13 the operating chains, and 14 a section of an oven or similar housing in which the conveyer is installed.

All of the links of the chains are alike, consisting of two parts with side bars 15, lateral lugs 16 extending in both directions at one of their ends and outwardly projecting bosses 17 at their other ends, bored to receive the outer lugs 16, the inner lugs meeting at the center of the chain; the parts of the chains being held together by bolts or pins 18 located in the lugs 16, as shown in the figures of the detail drawings. Besides the simplicity and facility of assembling the parts this construction affords great strength as the pivotal connection between the links are provided by their interlocking lugs and bosses, the functions of the bolts or pins 18 being merely to hold the parts of the chains in assembled position and may therefore be comparatively light.

Figure 2:
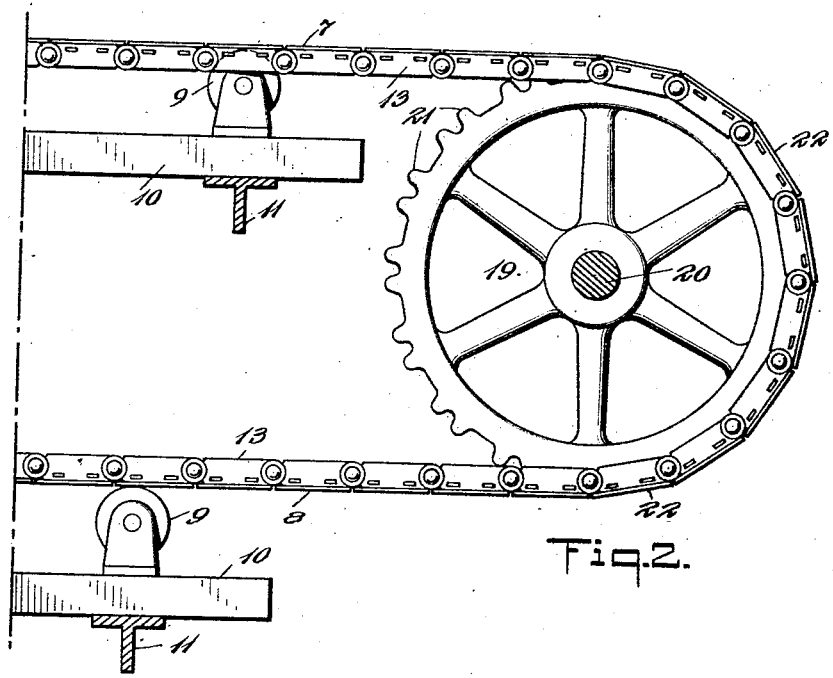
Fig. 2 is a longitudinal section of one end of the conveyer.
Figure 3:
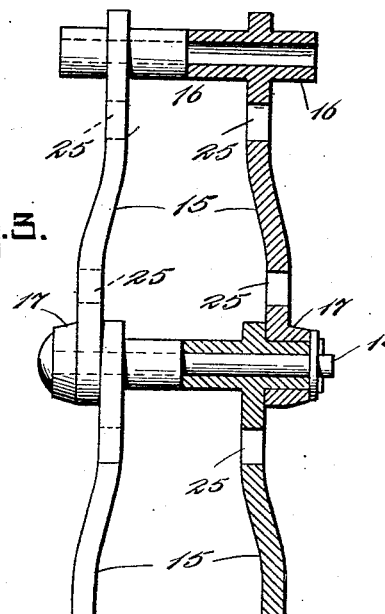
Fig. 3 shows a portion of one of the carrying chains, illustrating the manner in which the side bars are connected.

The chains pass over and are controlled by sprocket wheels 19 carried on a drive or supporting shaft 20 at each end of the run of the conveyer, the inner lugs 16 of the links being engaged by the teeth 21 of the sprocket wheels as shown in Fig. 2.

Figure 4:
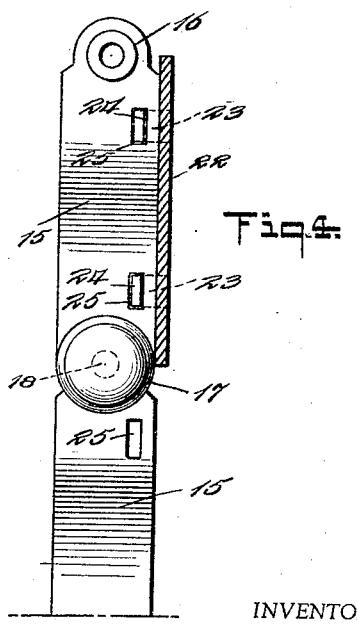
Fig. 4 is a side view of Fig. 3, showing one of the slats or bars applied thereto.
Figure 5:
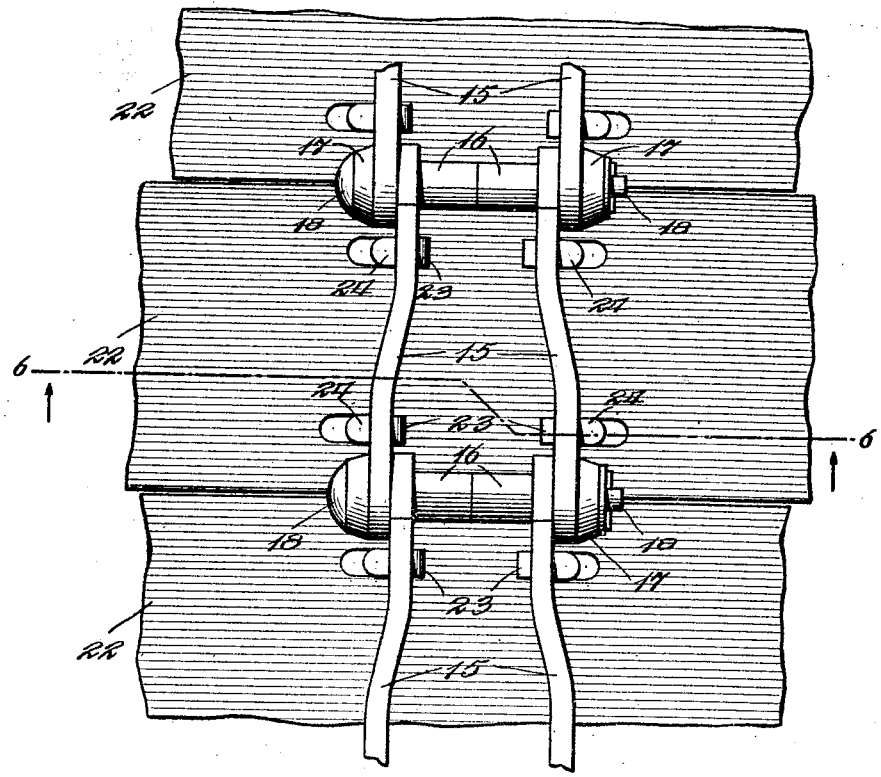
Fig. 5 is a view of a portion of the conveyer showing the expansible connections between the chain links and the slats, and, Fig. 6, is a sectional view on the line 6—6 of Fig. 5.
Figure 6:
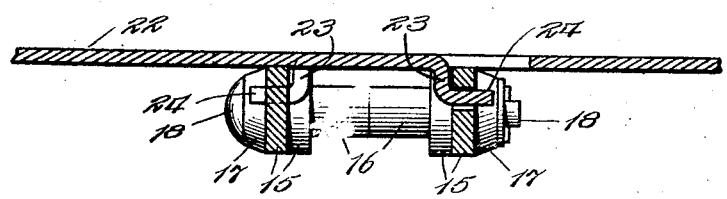

An effective and simple means for holding the slats or bars 22 on the links of the chain, without the use of bolts or screws or other separate fastening devices, consists in providing the body of the slats or bars, which are preferably flat metal bars, with ears or projections 23, forming by punching or otherwise pressing said ears into shape with their free ends 24 parallel to and a short distance from a face of the slats, as clearly shown in Figs. 4, 5 and 6. These ears 23—24 are so located on the slats 22 as to enter slots 25 formed through the side bars 15 of the links with the slats seated on and against the edges of the chains, the arrangement being such, with the parts so assembled that whilst the slats are securely held in operative position they are free to expand and contract without bending or otherwise being submitted to distortion, thus avoiding all undue strains on the chains and running gear; furthermore it is obvious, from an inspection of the drawing particularly Figs. 5 and 6, that any part of the chains or slats that may require repair or renewal can readily be removed and replaced by slipping out the necessary pins 18, to leave the side bars 15 free to be slipped off the ears 23—24 of the slats to be removed.

I claim:

1. An apron conveyer, comprising a carrying chain the links of which consist of two parts each constituting a side bar having lateral lugs at one end and a perforated boss at its other end into which a lug of an adjacent side bar is seated, said lugs and bosses working under and receiving all draft strains and a bolt or pin located in the lugs for holding the two parts of the links in operative position, laterally arranged slats or bars of a width substantially equal to the lengths of the links of the chains and means integral with the slats for connection with the side bars of the chain.

2. An apron conveyer, comprising a carrying chain the links of which consist of two parts each constituting a side bar having lateral lugs at one end and a perforated boss at its other end into which a lug of an adjacent side bar is seated, said lugs and bosses working under and receiving all draft strains and a bolt or pin located in the lugs for holding the two parts of the links in operative position, laterally arranged slats or bars of a width substantially equal to the lengths of the links of the chains, ears or projections formed from the body of the slats with their free ends parallel to a face of the slats and slots formed through the side bars of the chains into which the free ends of ears seat without restraining friction.

Signed at Newark, in the county of Licking and State of Ohio, this 25th day of January, 1923.

JOHN S. HERZOG. [L. S.]